3,124,540
PROCESS FOR PREPARING A SILICA-MAGNESIA-FLUORINE HYDROCARBON CRACKING CATALYST
Charles P. Wilson, Jr., 2840 Burnet Ave., Cincinnati 19, Ohio; John B. Jones, 933 Bardswell Ave., Baltimore 28, Md.; and Frank G. Ciapetta, 1628 Oaklawn Court, Silver Spring, Md.
Filed Dec. 22, 1960, Ser. No. 77,661
3 Claims. (Cl. 252—441)

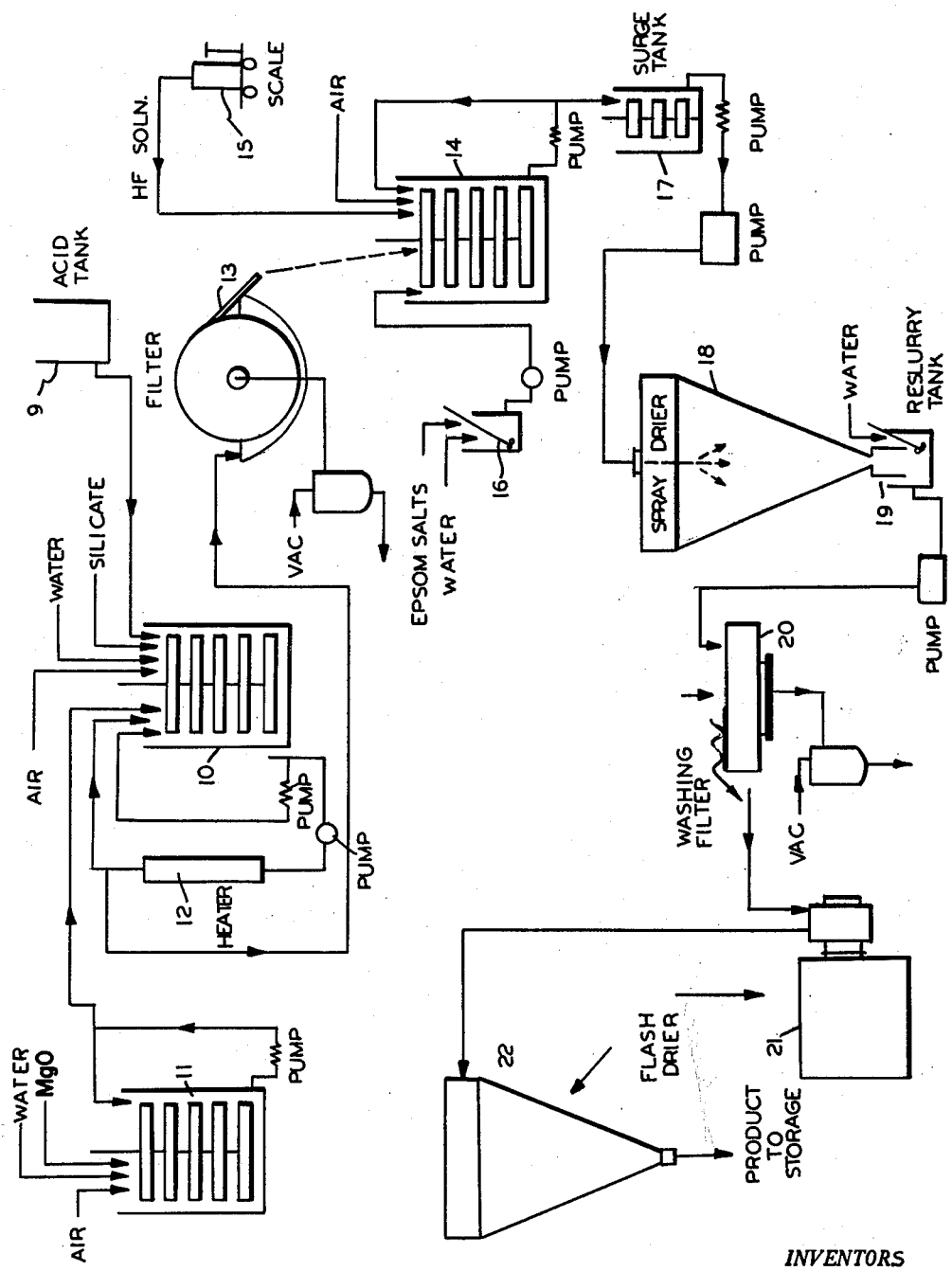

This invention relates to hydrocarbon carcking catalysts and in particular to the preparation of silica-magnesia-fluorine composites suitable for use as hydrocarbon cracking catalysts.

Silica-magnesia catalysts have been prepared by a variety of processes. One process involves mixing silica gel with a colloidal magnesia-magnesium oxysalt complex to effect a swelling of the resulting product. The disadvantage of this process is that the mganesium oxide reacts with aqueous solutions of said salts to form compounds having cementitious properties. Thus magnesium oxide, for example, interacts with magnesium chloride to form sorel cement and a similar result is obtained when the sulfate is substituted for the chloride.

Rigid controls are practiced to prevent solidification and lumping of the reaction mixture in preparing a silica-magnesia catalyst using the oxysalt process. These controls involve the introduction of additional water into the magnesia-magnesium oxysalt system. This addition is disadvantageous in that the excess water places an added load on the processing equipment, particularly in filtering and drying the magnesia-silica slurry.

We have found that a silica-magnesia-fluorine catalyst can be prepared by reacting magnesium hydroxide with silica hydrogel, recovering the silica-magnesia complex therefrom, reslurrying the complex with a solution containing dissolved fluorine in an amount sufficient to impregnate the silica-magnesia complex with from about 0.5 to about 5% residual fluorine. The product is then washed and dried using conventional techniques.

In preparing the silica-magnesia-fluorine catalyst of our invention, silica gel is prepared from dilute sodium silicate solution. The preferred weight ratio of silica to sodium oxide in the silicate is approximately 3:1. The silica concentration of the diluted silicate is maintained as high as practicable to aid in the combination of the silica with the magnesium component as well as to afford a greater rate of production in commercial equipment. Thus silica concentrations of from 3–12% gives satisfactory results, the preferred concentrations being 5–8%. The silica is gelled by adding sulfuric acid stepwise to prevent solidification and formation of hard lumps of silica gel which would be difficult to disperse and to bring into intimate contact with the hydrated magnesia.

In preparing our silica gel the final product attritions are not satisfactory when less than about 80% of the sodium oxide in the silicate is neutralized by the acid of gelation. In the preferred process we neutralize about 90% of the sodium oxide in the silicate and reduce the pH to about 6.5 to 7.5. This pH control is very important. When an excess of acid is added so that greater amounts of sodium oxide are neutralized and the pH drops to below about 5.0 the silica gel tends to peptize and solidification or objectionable lumping occurs when the hydrated calcined magnesia is subsequently added.

The temperature of the silica gel during and after neutralization to the desired pH is controlled in the range of about 80–150° F., preferably about 110–130° F. The temperature of gelation and aging time together with the silica concentration determine the time and temperature which must be subsequently employed to effectively combine the silica with the magnesia component and to yield a product with the desired physical properties. Higher temperatures of gelation and silica concentration and longer aging times of the silica gel require higher temperatures and longer aging times to combine the silica gel with the hydrated magnesia.

After the silica gel has been prepared either hydrated calcined magnesia or precipitated magnesium hydroxide is added to give the desired magnesium oxide content in the final product. After allowing for the loss of water soluble magnesium compounds through the reaction of sulfuric acid with hydrated calcined magnesia in the presence of silica hydrogel, the magnesia is added to give a magnesium oxide content in the final product of between 20–30% (expressed as MgO). The preferred magnesium oxide content is 24–28%.

In the preparation of the hydrated calcined magnesia a minimum amount of water is used for hydration. This is accomplished by preparing a slurry containing about 1 part MgO to 2 parts by weight of water, heating the slurry to about 130° F. to initiate the reaction and then slowly adding only sufficient additional water to prevent solidification and to obtain a very viscous but pumpable slurry. This slurry contains about 27% magnesia expressed as MgO. The hydrated slurry is allowed to age for periods of time from a few hours to about 18 hours.

When calcined magnesia is hydrated with water prior to contact with sulfuric acid or magnesium sulfate, complete conversion to magnesium hydroxide $Mg(OH)_2$ is difficult. After addition of sulfuric acid the complex formed contains at least some magnesium oxysulfate mixed with magnesium oxide. Where a precipitated magnesium hydroxide $Mg(OH)_2$ is used, there is no likelihood or probability for magnesium oxide to be present. In one process set out in the examples below the magnesium hydroxide is precipitated from magnesium sulfate. Magnesium oxide cannot be present under these conditions. The product recovered from the process in which the magnesium hydroxide is prepared by precipitation from the sulfate is obviously different from the product obtained where calcined magnesia is hydrated to supply the magnesium for the catalyst in that the final products differ in their physical properties.

Thus, by our novel process we can modify the preparation procedure to obtain products with certain physical characteristics. Thus, for example, the pore volume of the product can be increased by changing the conditions for the preparation of the silica hydrogel.

We have found in the preparation of commercial size batches that the magnesia component would be more readily dispersed in the silica gel when a preslurry with water is made prior to mixing with the silica hydrogel. Lumping is avoided by forming a smooth slurry of magnesium oxide in cold water prior to initiating the hydration reaction by heating the slurry.

After mixing the hydrated magnesia with the silica gel a predetermined quantity of dilute sulfuric acid may be added to bring the silica magnesia components to the desired degree of combination. The preferred concentration of acid is 25–50%. The sulfuric acid is added in an amount equivalent to 4–25 moles of input magnesium hydroxide per mole of acid, preferably 6–10 moles of input magnesium hydroxide per mole of acid. The time required to bring the silica-magnesia components to the desired degree of combination as well as the physical and chemical properties of the final product are effected by the quantity of acid employed. In general, larger amounts of acid give products having higher surface areas. The extent of combination of the silica-magnesia and the formation of the complex magnesium silicate suitable for use as a cracking catalyst is measured by the cracking activity and attrition. In silica-magnesia cracking catalysts the activity generally follows the surface area.

Surface area is considered a criterion of cracking activity. To effect the desired "degree of activation" the silica-magnesia slurry is heated in the presence of sulfuric acid. Although temperatures of 180° F. have been used in the example of this disclosure, temperatures in the range of 150° F. could be used although longer periods of time would be needed to obtain the same level of activation as that obtained by heating to 180° F.

After the silica-magnesia components have been suitably combined by our novel activation procedure, this slurry is then filtered to remove a maximum quantity of free water and water soluble salts. The filter cake is dispersed in a minimum quantity of water to which had been added epsom salts ($MgSO_4 \cdot 7H_2O$) and hydrofluoric acid is added at this stage of the process. A sufficient amount of hydrofluoric acid is added to give a fluorine content of 0.5–5% by weight residual fluorine in the final product. The fluorine content of the product can be obtained and a suitable catalyst will result in a process where the solution of epsom salts is not added. A suitable product is obtained when freshly precipitated magnesium fluoride is added in an amount sufficient to give a final fluorine content of about 0.5–5% in the final catalyst.

Although HF is the most desirable, other compounds containing fluorine which form insoluble salts with magnesium ions may be used to supply the fluorine in our process. Other soluble fluorides suitable for such use include $NH_4F$, $H_2SiF_4$, $NH_4HF_2$, $(NH_4)_2SiF_6$, etc.

The soluble fluoride is used to obtain maximum dispersion of the fluoride ion in the catalyst whereas the epsom salts are added, in cases where appreciable sodium is present in the filter cake for the purpose of supplying previously dissolved magnesium ions to react with the fluoride ion forming magnesium fluoride in preference to sodium fluoride. Sodium fluoride is difficult to remove by washing and sodium is a constituent that cannot be tolerated in appreciable quantities in the final product. However, the reaction of the fluorine with sodium can be prevented by using freshly precipitated magnesium fluoride. The precipitation of magnesium fluoride is effected in the water employed to reslurry the silica-magnesia filter cake in a later step of the process.

Flourine is important in the catalyst of our novel process in that fluorine stabilizes the strength of the catalyst at high temperatures. Suitable catalysts can be prepared without fluorine if temperatures below 1350° F. are to be used. However, at temperatures above 1350° F., the catalyst structure collapses if fluorine is not present as a catalyst component.

For reasons of economy we use only sufficient fluorine to give the desired thermal stability to the product. This amount is largely measured by determination of the physical properties and cracking activity of the product after 3 hours heat treatment at 1550° F. While we have found that suitable catalysts can be prepared in which the fluorine concentration is between 0.5–5%, the preferred range is 2–3%. We have found that about 2.5% fluorine is ample for most applications.

Presence of fluorine shows no particular effect on the surface area of the product at 1700° F. but imparts a definite increase in pore volume as compared to products without fluorine. The pore volumes were most favorable where the product was prepared from hydrated calcined magnesia. The surface areas at temperatures above 1700° F. were also more favorable when hydrated magnesia was used to prepare the catalyst.

The invention is further illustrated by the following specific but non-limiting examples.

In Examples I and II products have been prepared from calcined magnesia and from hydrated calcined magnesia using identical procedures.

EXAMPLE I

A total of 27 gallons of sodium silicate at 118° F. and containing 27.6 g. per liter of $Na_2O$ and 91 g. per liter of silica were reacted in a mixing tank with 3950 ml. of 39% sulfuric acid. The reactants were thoroughly mixed by means of a rotating mixer and continuously recirculated by means of a centrifugal pump. Gelation occurred rapidly at a pH of about 10.7. The mixing at 125° F. was continued for a short period of time and an additional 4530 ml. of sulfuric acid was added. The pH dropped to 6.5 and the resulting silica hydrogel slurry was aged for 1½ hours at 125° F.

To the aged hydrogel slurry there was then added a total of 8¾ lbs. calcined magnesia and 2370 cc. of 39% sulfuric acid in 10 increments, each increment being one tenth of the total material added. In each case the magnesia was added first followed by addition of the sulfuric acid. After the addition of magnesia was complete, the pH was approximately 9.4. The temperature of the slurry was increased to 180° F. the pH of the slurry dropped to approximately 8.0. The slurry was aged at 180° F. for 2 hours and then filtered to partly remove the free water together with such water soluble salts as magnesium sulfate and sodium sulfate. After being aged for 2 hours the pH of the slurry was 7.3.

A 15 lb. portion of the filter cake was removed from the total and reslurried with 750 ml. of water containing 210 g. of epsom salts ($MgSO_4 \cdot 7H_2O$). To this very thick slurry was added 81 g. of 48% hydrogen fluoride solution. The product was spray dried. A small sample of the spray dried product was ignited to constant weight at 1750° F. The loss on ignition was 11.94%.

Another 15 lb. portion of the filter cake was treated as above except it was reslurried with water without epsom salts. No fluorine was added. The product was spray dried. A small sample of the spray dried product was ignited to constant weight at 1750° F. The ignition loss of this spray dried product was 12.91%.

Washing was effected by reslurrying 400 g. portions of the spray dried product with 2 liters of 2° Baumé ammonium sulfate solution adjusted to a pH of 9.0 with ammonia and heated to 90° F. This wash was followed by three rinses with 2 liters of distilled water adjusted to pH 9.0 with ammonia and heated to a temperature of 90° F. The products were dried at 300° F.

EXAMPLE II

A total of 27 gallons of sodium silicate at 120° F. and containing 27.6 per liter of sodium oxide and 91 g. per liter of silica were reacted in a mixing tank with 3950 ml. of 39% sulfuric acid. The reactants were mixed by a rotating mixer as in Example I, gelled, and the pH reduced to 6.5 by the addition of 4530 cc. of 39% sulfuric acid. The hydrogel was aged as before at a temperature of 125° F. for a period of 1½ hours.

To the aged hydrogel slurry there was added previously prepared hydrated calcined magnesia prepared as follows: To 8¾ lbs. of calcined magnesia was added 15 lbs. of cold water. The mixture was stirred to obtain a lump free slurry and heated to 130° F. The heat of the reaction was allowed to raise the temperature to boiling and then 3.5 liters of water were added to maintain the slurry at a pumpable condition. The slurry was cooled to room temperature and allowed to stand for approximately 24 hours. The hydrated calcined magnesia was added to the silica hydrogel in 10 equal increments along with 2370 cc. of 39% sulfuric acid. The temperature of the resulting silica-magnesia complex was raised to 180° F. over a period of about 20 minutes at which time the pH of the slurry was approximately 8.3. The slurry was aged for 2 hours at 180° F. and filtered.

A 15 lb. portion of the filter cake was reslurried with 750 cc. of water containing 210 g. of epsom salts ($MgSO_4 \cdot 7H_2O$). To this thick slurry was added 81 g.

of 48% HF solution. Another 15 lb. portion was reslurried with water without epsom salts and spray dried. Portions of this spray dried product (400 g. each) was reslurried with 2 liters of 2° Baumé ammonium sulfate at 90° F., adjusted to a pH of 9.0 with ammonia. The filtrate was separated and the cake washed twice more with a 2° Baumé ammonium sulfate solution and rinsed three times with 2 liters each distilled water at 90° F., adjusted to a pH of 9.0 with ammonia. The washed product was dried at 300° F.

The chemical analysis of the catalysts prepared from calcined magnesia and from hydrated calcined magnesia are shown in Table I below.

*Table I*

| Chemical Analysis Percent Dry Basis | Product of Example I Calcined MgO | | Product of Example II Hydrated Calcined MgO | |
| --- | --- | --- | --- | --- |
| | With Fluorine | No Fluorine | With Fluorine | No Fluorine |
| MgO | 27.99 | 27.86 | 25.63 | 25.70 |
| $Na_2O$ | 0.021 | 0.017 | 0.029 | 0.022 |
| $SO_4$ | 0.80 | 0.11 | 0.17 | 0.23 |
| Fe | 0.044 | 0.08 | 0.078 | 0.038 |
| Fluorine | 2.49 | | 2.44 | |

The physical properties of this catalyst are presented in Table II.

*Table II*

| Physical Properties | Product of Example I Calcined MgO | | Product of Example II Hydrated Calcined MgO | |
| --- | --- | --- | --- | --- |
| | With Fluorine | No Fluorine | With Fluorine | No Fluorine |
| Thermal Pretreatment, 3 hrs. at 1250° F.: | | | | |
| Surface Area m.²/g. (BET Method) | 526 | 484 | 482 | 534 |
| Pore Volume cc./g. ($H_2O$) | 0.59 | 0.46 | 0.55 | 0.45 |
| Thermal Pretreatment, 3 hrs. at 1550° F.: | | | | |
| Surface Area m.²/g. (BET Method) | 176 | 43 | 262 | 139 |
| Pore Volume cc./g. ($H_2O$) | 0.36 | 0.06 | 0.46 | 0.23 |
| Thermal Pretreatment, 3 hrs. at 1700° F.: | | | | |
| Surface Area m.²/g. (BET Method) | 49 | | 120 | 120 |
| Pore Volume cc./g. ($H_2O$) | 0.30 | | 0.36 | 0.21 |

The attrition index is obtained by subjecting the catalyst to a high velocity air jet by a standard test known as the Roller test. The weight of minus 20 micron particles formed during the test is measured as a criterion of the resistance of the catalyst to inter-particle attrition. The index is obtained by the formula $$\frac{100(A-B)}{C}$$

where
A = 0-20 micron content of calcined catalyst after attrition, in grams;
B = 0-20 micron content of calcined catalyst before attrition, in grams;
C = plus 20 micron content of calcined catalyst before attrition in grams.

The attrition indices for the products of Examples I and II are set out in the table below.

*Table III*

| | Product of Example I With Fluorine | Product of Example II With Fluorine |
| --- | --- | --- |
| Attrition Index (Davison) | 18.4 | 14.1 |

In order to determine the cracking activity and stability of catalysts of the type prepared by this invention, an accelerated test has been devised to simulate the conditions prevalent during the early period of catalyst use where the decrease of catalyst stability is most pronounced. This test involves compressing a sample of fresh catalyst into pellets and splitting the pellets into two portions, one for thermal deactivation and one for steam deactivation. Thermal deactivation of the catalysts prepared according to the preceding example was carried out first at 1250° F. for 3 hours and afterward split into two portions. One portion was further heat treated for 3 hours at 1350° F. and the second portion was treated for 3 hours at 1550° F. Steam deactivation was carried out first by heat treatment for 3 hours at 1250° F., followed by treatment in an atmosphere of steam at 60 p.s.i.g. and 1050° F. for 24 hours.

In carrying out the activity tests, 200 ml. of deactivated catalyst were placed in a reactor and maintained at a temperature of 850° F. During a period of 2 hours, 238.2 ml. of virgin East Texas light gas oil were passed through the hot catalyst. The cracked products were recovered and separated. The fraction which distilled below 400° F., as well as gas and loss, was determined and designated as distillate plus loss, or more simply, D+L. The results of these tests are reported in Table IV below.

*Table IV*

| Steam Activity | Product of Example I Calcined Magnesia | | Product of Example II Hydrated Calcined Magnesia With Fluorine |
| --- | --- | --- | --- |
| | With Fluorine | No Fluorine | |
| D+L, percent | 44.7 | 43.0 | 40.7 |
| G.P.F. | 0.85 | | 0.87 |
| C.P.F. | 0.84 | | 0.92 |
| Thermal Activity, 3 hrs. at 1350° F.: | | | |
| D+L, percent | 55.3 | 57.2 | 52.5 |
| G.P.F. | 0.87 | 0.91 | 0.88 |
| C.P.F. | 0.87 | 0.82 | 0.88 |
| Thermal Activity, 3 hrs. at 1550° F.: | | | |
| D+L, percent | 27.4 | 5.4 | 41.4 |
| G.P.F. | 0.83 | 2.03 | 0.99 |
| C.P.F. | 0.81 | 2.50 | 0.96 |

G.P.F. and C.P.F. refer to "gas producing factor" and "carbon producing factor" respectively. The values assigned these factors are relative to the gas and carbon produced by a standard catalyst, which is taken as 1.00 in both cases, and represent measures of catalyst selectivity.

The catalysts containing fluorine prepared according to the process of this invention gave carbon and gas values well below the standard catalyst. Of further significance is the excellent thermal stability of the catalysts when thermally treated at 1550° F.

It should be pointed out that the addition of 0.5 to 5.0% by weight of fluorine to the catalyst stabilizes the structure for operation at high temperature. This is exemplified by the catalyst prepared according to the process of Example I which did not contain fluorine. It is noted that thermal treatment of this catalyst at 1550° F. gave a D+L of only 5.4%. This failure to withstand the high temperature indicates a substantially complete collapse of the catalyst structure.

Review of the data shown in Tables I through IV covering the properties of products prepared from calcined magnesia and hydrated calcined magnesia reveals an exceptionally high surface area and cracking activity, after treatment at 1550° F., for the hydrated magnesia product. For example, a 1550° F. D+L of 41.4 compared to only 27.40 D+L for the calcined MgO product. For this reason the hydrated product is favored despite a slightly lower steam D+L.

EXAMPLE III

The effect of decreasing the amount of "activation" acid added to the hydrated calcined magnesium oxide was demonstrated in Examples III and IV in which the procedure of Example II was duplicated with the exception of a decrease in the quantity of "activation" acid added to the hydrated calcined magnesium oxide in Example IV.

A total of 20 gallons of sodium silicate solution containing 27.6 g. per liter sodium oxide and 91 g. per liter of silica were heated to a temperature of 118° F. The sodium silicate solution was reacted with 2930 ml. of 39% sulfuric acid. The gelation occurred in 6 minutes at a pH of 10.7. The slurry was mixed for 10 minutes and an additional 3315 ml. of 39% sulfuric acid was added. The pH at this point was 6.5. The temperature of the gel was increased to 125° and aged for 1½ hours. The pH at this point was 7.05.

Magnesium hydrate was prepared by adding 6¾ lbs. calcined magnesia to 11½ lbs. cold water. The mixture was stirred to give a lump free slurry and heated to 130° F. The heat of the reaction was allowed to raise the temperature to boiling and 2.7 liters of water were added. The solution was cooled to room temperature and allowed to stand for approximately 24 hours.

The previously prepared hydrated calcined magnesia was added to the aged hydrogel slurry in 10 equal increments of approximately one tenth of the total slurry along with a total of 1750 ml. of 39% sulfuric acid. After the addition was complete the temperature was raised to 180° F. over a period of approximately 30 minutes. The slurry was hot aged at 180° F. for 2 hours. At the end of this time approximately one half of the hot aged slurry was filtered. This portion is designated as part A. The other half of the slurry was hot aged for an additional hour and filtered. This portion is designated as part B. The product designated as part A was treated as follows: A 15 lb. portion of the filter cake was reslurried with 500 cc. of water containing 200 g. of epsom salts. A total of 81 g. of 48% HF solution was added. The pH at this point was 7.5. The product was spray dried.

The portion designated as part B was treated as follows:

$B_1$: A 15 lb. portion of the filter cake was reslurried with 500 ml. of water containing 210 g. epsom salts. A total of 81 g. of 48% HF solution was added. The pH at this point was 6.4. The product was spray dried.

$B_2$: A total of 15 lbs. of filter cake was reslurried with 500 cc. of water containing 210 g. of epsom salts. A total of 40.5 g. of 48% HF solution was added. The pH at this point was 6.9. The product was spray dried.

$B_3$: A total of 15 lbs. of filter cake was reslurried with 500 cc. of water containing 210 g. of epsom salts. No fluorine was added to this product. The pH at this point was 8.7. The product was spray dried as before.

All of the spray dried products were washed by reslurrying 400 g. portions with 2 liters of 2° Baumé ammonium sulfate adjusted to a pH of 9.0 with ammonia and heated to 90° F. This wash was followed by three 2 liter rinses of distilled water adjusted to a pH of 9.0 with ammonia and heated to a temperature of 90° F. The products were dried at 300° F.

The chemical analysis and physical properties of this product are set out in Table V.

Table V

| Chemical Analysis, percent Dry Basis | Portion Designated as Part A | Portion Designated as— | | |
|---|---|---|---|---|
| | | Part $B_1$ | Part $B_2$ | Part $B_3$ |
| Fluorine | 2.53 | 2.43 | 1.03 | none |
| MgO | | 28.18 | 27.61 | 27.08 |
| $Na_2O$ | | .027 | .022 | .018 |
| $SO_4$ | | .10 | .05 | .04 |
| Fe | | .066 | .058 | .055 |
| Physical Properties— | | | | |
| Thermal Pretreatment, 3 hrs. at 1250° F.: | | | | |
| Surface Area, m.²/g. (BET Method) | 423 | 567 | 573 | 572 |
| Pore Volume, cc./g. ($H_2O$) | 0.85 | 0.68 | 0.61 | 0.56 |
| Thermal Pretreatment, 3 hrs. at 1550° F.: | | | | |
| Surface Area, m.²/g. (BET Method) | 225 | 252 | 179 | 132 |
| Pore Volume, cc./g. ($H_2O$) | 0.69 | 0.50 | 0.35 | 0.23 |
| Thermal Pretreatment, 3 hrs. 1700° F.: | | | | |
| Surface Area, m.²/g. (BET Method) | 150 | 98 | 132 | 120 |
| Pore Volume, cc./g. ($H_2O$) | 0.66 | 0.40 | 0.23 | 0.19 |

Attrition indices were determined using the method described in Example I. The data as well as the total volatiles of the spray dried product are presented in the table below.

Table VI

| | Portion Designated as— | |
|---|---|---|
| | Part A | Part B |
| Attrition Index (Davison) | 22.0 | 17.1 |
| T. V. Spray Dried Product | 14.36 | 13.25 |

The effect of fluorine addition is apparent from an examination of the pore volume data collected for the products after treatment at 1700° C. for 3 hours. The smallest percentage decrease was noted when the catalyst contained 2.53% fluorine. The decrease was most marked where the catalyst contained no fluorine.

The effect of fluorine on both the surface area and pore volume was quite pronounced after treatment at 1550° F. for three hours.

EXAMPLE IV.—EMPLOYING A QUANTITY OF "ACTIVATION" ACID EQUIVALENT TO 16 MOLS INPUT MgO PER MOL $H_2SO_4$

A total of 15 gallons of dilute sodium silicate solution containing 27.6 g. per liter of sodium oxide and 91 g. per liter of silica was heated to 118° F. and reacted with 2200 ml. of 39% sulfuric acid. The reactants were thoroughly mixed by a rotating mixer and continuously recirculated by means of a centrifugal pump. Gelation occurred in 6 minutes at a pH of 10.7. Mixing was continued for an additional 10 minutes and 2430 ml. of 39% sulfuric acid was added. The pH dropped to 6.5. The temperature was increased to 125° F. and the silica hydrogel aged for 1½ hours at 125° F.

Calcined magnesium hydrate slurry was prepared 24 hours previously by adding 8.6 lbs., cold water to 5 lbs. calcined magnesium oxide. The mixture was stirred to obtain a smooth lump free slurry and heated to 130° F. The temperature of the reaction was allowed to raise to boiling and an additional 2025 ml. of water was added. The slurry was cooled to room temperature and allowed to stand overnight.

The hydrated calcined magnesia was added to the aged hydrogel slurry along with 655 ml. of 39% sulfuric acid. The addition was made in 10 equal increments of approximately 1/10 of the total. The pH after addition of the magnesia and acid was approximately 8.6. The temperature was raised to 180° F. over a period of 30 minutes. The product was split into two portions designated portions C and D. Part C was hot aged 2 hours at 180°, then filtered. Part D was hot aged 3 hours at 180° then filtered.

The portion designated as part C was treated as follows: A 15 lb. portion of the filter cake was reslurried with 500 ml. of water containing 210 g. of epsom salts and 81 g. of 48% HF solution were added. The pH at this point was 7.6. The product was spray dried.

The portion designated part D, hot aged 3 hours at 180° F., and filtered, the products designated $D_1$, $D_2$, $D_3$ were treated as follows:

$D_1$: 15 lbs. of the filter cake was reslurried with 500 ml. of water containing 210 g. of epsom salts and 81 g. of 48% HF solution was added. The pH at this point was 7.2. The product was spray dried.

$D_2$: 15 lbs. of the filter cake was reslurried with 500 ml. of water containing 210 g. of epsom salts and 40.5 g. of 40% HF solution was added. The product was spray dried.

$D_3$: A 15 lb. portion of the filter cake was reslurried with 500 ml. of water containing 210 g. of epsom salts. The product was spray dried.

400 g. portions of each of the products of Examples III and IV were washed with 2 liters of 2° Baumé ammonium sulfate, adjusted to a pH of 9.0 with ammonia and heated to 90° F. This wash was followed by three 2 liter rinses with distilled water adjusted to a pH of 9.0 with ammonia and heated to a temperature of 90° F. The products were dried at 300° F.

The chemical analysis and physical properties of the catalyst are set out in the table below.

*Table VII*

| Chemical Analysis, Percent Dry Basis | Product of Example IV C | Product of Example IV | | |
|---|---|---|---|---|
| | | $D_1$ | $D_2$ | $D_3$ |
| Fluorine | 2.66 | 2.84 | 1.36 | none |
| MgO | | 26.74 | 28.49 | 28.30 |
| $Na_2O$ | | .024 | .019 | .022 |
| $SO_4$ | | .23 | .20 | .17 |
| Fe | | .065 | .062 | .072 |
| Physical Properties— | | | | |
| Thermal Pretreatment 3 hrs. at 1250° F.: | | | | |
| Surface Area, m.²/g. (BET Method) | 371 | 463 | 509 | 518 |
| Pore Volume, cc./g. ($H_2O$) | 0.93 | 0.75 | 0.72 | 0.66 |
| Thermal Pretreatment, 3 hrs. at 1550° F.: | | | | |
| Surface Area, m.²/g. (BET Method) | 209 | 254 | 218 | 161 |
| Pore Volume, cc./g. ($H_2O$) | 0.78 | 0.62 | 0.52 | 0.39 |
| Thermal Pretreatment, 3 hrs. at 1700° F.: | | | | |
| Surface Area m.²/g. (BET Method) | 126 | 101 | 129 | 121 |
| Pore Volume, cc./g. ($H_2O$) | 0.71 | 0.53 | 0.45 | 0.35 |

Attrition indices were determined using the method described in Example I. This data as well as the total volatiles of the spray dried product are presented in Table VIII.

*Table VIII*

| | Portion Designated as— | |
|---|---|---|
| | Part C | Part D |
| Attrition Index (Davison) | 26.6 | 22.0 |
| T.V. Spray Dried Product | 14.53 | 12.48 |

It is apparent the data presented in Table VII confirms the data shown in Table V that the addition of fluorine definitely improves the stability of the catalyst at such high temperatures as 1550° F. and over.

EXAMPLE V

A silica-magnesia catalyst was prepared by using magnesium hydroxide precipitated from magnesium sulfate as a source of magnesia.

A total of 7½ gallons of sodium silicate containing 27.5 g. per liter of $Na_2O$ and 90.5 g. per liter of $SiO_2$ was heated to 118° F. and 1085 ml. of 39% sulfuric acid was added. The slurry was mixed using the techniques described in Example I. Gelation occurred in a period of 6 minutes at a pH of 10.7. The slurry was stirred for 10 minutes and an additional 1360 ml. of 39% sulfuric acid was added. This addition decreased the pH to 6.5. The slurry was heated to 125° F. and maintained at this temperature for a period of 1½ hours. At this point, the pH of the silica gel was 7.0.

Magnesium hydroxide filter cake was prepared by dissolving 100 lbs. of epsom salts ($MgSO_4 \cdot 7H_2O$) in 40 gallons of water. Magnesium hydroxide was precipitated from the solution by adjusting the pH to 10.0 with dilute sodium hydroxide. The precipitate was filtered and the cake washed with water to remove soluble sodium hydroxide and other sodium salts.

A 20 lb. portion of this cake containing 16.75% $Mg(OH)_2$ was added to the aged silica gel. The magnesium hydroxide was dispersed in the silica hydrogel, stirred and circulated through a centrifugal pump. The addition of the magnesium hydroxide increased the pH of the silica-magnesia slurry to 8.8. The slurry was treated by adding a total of 650 ml. of 39% sulfuric acid. The pH at this point was 8.6. The temperature of the slurry was increased to 180° F. over a period of 25 minutes and aged for 3 hours at this temperature. At the end of this time the slurry was filtered to recover the silica-magnesia component.

The silica-magnesia filter cake was impregnated with fluorine by first preparing a thick slurry of 15 lbs. of the cake with 500 ml. of water containing 210 g. of epsom salts ($MgSO_4 \cdot 7H_2O$). A total of 81 g. of 48% hydrogen fluoride solution was added to the thick slurry. The slurry was spray dried and the product washed and finally dried using the same procedure described in Example III. The physical and chemical properties of the product are given in Table IX below.

*Table IX*

Chemical analysis, percent dry basis:
 Fluorine _____ 2.83
 MgO _____ 25.58
 $Na_2O$ _____ 0.02
 $SO_4$ _____ 1.5
 Fe _____ 0.093

Physical properties:
 Thermal treatment, 3 hrs. at 1250° F.—
  Surface area, m.²/g _____ 592
  Pore volume, cc./g _____ 0.46
 Thermal treatment, 3 hrs. at 1550° F.—
  Surface area, m.²/g _____ 220
  Pore volume, cc./g _____ 0.29
 Thermal treatment, 3 hrs. at 1700° F.—
  Surface area, m.²/g _____ 83
  Pore volume, cc./g _____ 0.24

The cracking activity of these catalysts was determined using the procedure described in detail in Example II. The data collected is presented in the table below.

*Table X*

Steam activity:
 D+L _____ 45.3
 G.P.F _____ 0.92
 C.P.F _____ 0.89

Thermal activity at 1550° F.:
 D+L _____ 37.7
 G.P.F _____ 0.96
 C.P.F _____ 0.80

EXAMPLE VI

Plant operation of the process for preparing silica-magnesia fluoride catalyst from hydrated calcined magnesia is shown graphically in FIGURE 1.

A total of 3960 gallons of dilute sodium silicate containing 27.6 g. per liter of sodium oxide and 91 g. per liter of $SiO_2$ was added to a 5000 gallon tank 10 equipped for air and mechanical circulation together with a centrifugal pump for circulation of the slurry. The dilute silicate was heated to 118° F. and gelled by adding 158 gallons of 39% sulfuric acid from tank 9. The silica gel resulting from the acid addition was stirred for 10 minutes and then an additional 164 gallons of 39% sulfuric acid was added. The pH at this point was 7.2. The slurry was heated to 125° F. and aged for 70 minutes at this temperature.

A hydrated calcined magnesium slurry was prepared in tank 11 using the following techniques.

A total of 1290 lbs. (dry basis) of dry calcined magnesia derived from sea water was mixed with 280 gallons of cold water. The mixture was stirred by circulation through a centrifugal pump until a smooth slurry resulted. The slurry was heated to 130° F. to initiate the hydration reaction. The heat of reaction was allowed to increase the temperature to boiling. A total of 170 gallons of water were added slowly to prevent solidification. The hydrated magnesia was cooled to room temperature and allowed to stand at room temperature overnight.

A total of 483 gallons of this hydrated calcined magnesia was transferred from the magnesia preparation tank 11 to the 5000 gallon tank 10 containing the silica gel. The magnesia was added in four equal increments followed by addition of 25 gallons of 39% sulfuric acid. The hydrated magnesia contained 25.6% MgO. The total acid added was 100 gallons.

The total magnesia added would be equivalent to 1290 lbs. of dry MgO or 1,810 lbs. $Mg(OH)_2$.

The temperature of the silica-magnesia slurry was increased to 180° F. and aged for 3 hours at that temperature. The slurry was then filtered on rotary filter 13 and the filter cake reslurried in the tank 14 with sufficient water from tank 16 to obtain a very viscous slurry. The water in tank 16 contained 672 lbs. of epsom salts and 288 gallons of water. This is equivalent to approximately 195 lbs. of 70% HF solution which was added to the slurry in tank 14 from tank 15. The components were mixed thoroughly and the viscous slurry pumped from tank 14 by a pump into the spray drier surge tank 17 from which it was pumped into the spray drier. The inlet temperature of the spray drier was 820° F. The outlet flue gas temperature was 300° F. and the cone discharge of the drier was 330° F. The slurry was forced into the spray drier by pumps at a pressure of 1800 lbs. per sq. in. Twelve nozzles of 0.75" diameter were used for distribution and forming the slurry into microspheres of the desired size.

The spray dried product was reslurried with water which had been adjusted with ammonia to a pH of 8–9. The reslurried spray dried product was pumped from the tank 19 to the wash filter 20 and the product washed in four stages. In the first stage the reslurry water containing salt impurities was removed. In the second stage the product was rinsed with water 100–110° F. In the third stage 0.4 Baumé ammonium sulfate solution adjusted to pH 9.2 with ammonia. This wash was at a temperature of 100–110° F. The product was rinsed in the fourth stage with deionized water at a pH of 9.0 and at a temperature of 100–110° F. The dewatered catalyst was carried by conveyors from the washing filter 20 to the flash drier 21 where the catalyst was flash dried by hot flue gases. The catalyst was collected in cyclone 22 and conveyed to storage.

The chemical analysis of the product prepared according to my process is presented in the table below.

*Table XI*

Chemical analysis, percent dry basis:

| | |
|---|---|
| Fe | 0.10 |
| MgO | 27.67 |
| $SO_4$ | 0.18 |
| $Na_2O$ | 0.039 |
| CaO | 0.23 |
| F | 2.23 |

The physical properties of the catalyst are presented in

*Table XII*

Physical Properties:
  Thermal pretreatment, 3 hrs. at 1000° F.—
    Surface area, m.²/g. (BET method) _____ 586
    Pore volume, cc./g. ($H_2O$) _____ 0.67
  Thermal pretreatment, 3 hrs. at 1250° F.—
    Surface area, m.²/g. (BET method) _____ 530
    Pore volume, cc./g. ($H_2O$) _____ 0.66
  Thermal pretreatment, 3 hrs. at 1450° F.—
    Surface area, m.²/g. (BET method) _____ 352
    Pore volume, cc./g. ($H_2O$) _____ 0.56
  Thermal pretreatment, 3 hrs. at 1550° F.—
    Surface area, m.²/g. (BET mthod) _____ 268
    Pore volume, cc./g. ($H_2O$) _____ 0.50
  Thermal pretreatment, 3 hrs. at 1650° F.—
    Surface area, m.²/g. (BET method) _____ 134
    Pore volume ($H_2O$) _____ 0.46
  Thermal pretreatment, 3 hrs. at 1700° F.—
    Surface area, m.²/g. (BET method) _____ 90
    Pore volume ($H_2O$) _____ 0.44

The particle size was determined by the Roller CAE method. This method is described in detail in U.S. Bureau of Mines Technical Paper 490 published in 1931. The technique depends on Stokes law of particle fall and involves a separation of particles by means of a current of air. Very briefly, the method consists in sorting out definite fractions by quantitative floating of the material in a current of air of controlled velocity. The sample to be fractionated is subjected for a definite period of time to the air current until particles of the desired size have been floated off and subsequently weighed. The particle size data is presented in Table XIII below.

*Table XIII*

Particle size:

| | |
|---|---|
| 0–20 | 0.7 |
| 20–40 | 13.9 |
| 40–80 | 56.8 |
| Plus 80 | 28.6 |

The cracking activity and stability of the catalyst was determined using the method set out in detail in Example II. This data is presented in Table XIV below.

*Table XIV*

Steam activity:

| | |
|---|---|
| D+L | 40.9 |
| G.P.F. | 0.90 |
| C.P.F. | 1.05 |

Thermal activity at:
  1000° F.—
    D+L _____ 47.9
    G.P.F. _____ 0.93
    C.P.F. _____ 1.03
  1250° F.—
    D+L _____ 48.7
    G.P.F. _____ 1.04
    C.P.F. _____ 0.96
  1450° F.—
    D+L _____ 41.5
    G.P.F. _____ 0.92
    C.P.F. _____ 0.90

*Table XIV—Continued*

Thermal activity at:
 1550° F.—
  D+L _____ 35.6
  G.P.F. _____ 0.94
  C.P.F. _____ 1.03
 1650° F.—
  D+L _____ 21.3
  G.P.F. _____ 0.99
  C.P.F. _____ 1.10

Obviously many modifications and variations of the invention as hereinabove set forth may be made without departing from the essence and scope thereof and only such limitations should be applied as are indicated in the appended claims.

What is claimed is:

1. A process for preparing a silica-magnesia-fluorine hydrocarbon cracking catalyst containing about 0.5 to 5% fluorine which comprises acidifying a dilute sodium silicate solution with sulfuric acid in an amount sufficient to cause gelation of the silica, adding sufficient sulfuric acid to neutralize 80–90% of the alkali originally present in the sodium silicate, adding a suspension of hydrated calcined magnesia to the resulting hydrogel, aging said slurry at a tempertaure of about 180° F. for a period of about 2–3 hours, recovering the resulting silica magnesia complex therefrom, dispersing on said complex an aqueous slurry containing free magnesium ions, reslurrying the resulting mass with a solution containing dissolved fluorine in an amount sufficient to impregnate said silica magnesia complex with from 0.5 to 5 weight percent residual fluorine and drying, washing and redrying the resulting composite.

2. A process for preparing a silica-magnesia-fluorine hydrocarbon cracking catalyst containing about 0.5 to 5% fluorine which comprises heating a dilute sodium silicate solution to a temperature of about 80–150° F., acidifying with sulfuric acid in an amount sufficient to cause gelation of the silica, adding sufficient sulfuric acid to neutralize 80–90% of the alkali originally present in the sodium silicate, adding a suspension of hydrated calcined magnesia to the resulting hydrogel, in an amount sufficient to give a magnesium oxide content in the final product 20–30%, accelerating the combination of the magnesia with the silica gel by adding sulfuric acid in an amount equivalent to 4–25 moles of input magnesium hydroxide per mole of acid, recovering the resulting silica magnesia complex therefrom, dispersing said complex in an aqueous slurry containing free magnesium ions by re-slurrying the complex with a solution containing magnesium sulfate, adding a solution containing dissolved fluorine in an amount sufficient to impregnate said silica-magnesia complex with from 0.5 to 5 weight percent residual fluorine and drying, washing and redrying the resulting composite.

3. A process for preparing a silica-magnesia-fluorine hydrocarbon cracking catalyst containing about 0.5 to 5% fluorine which comprises heating a dilute sodium silicate solution to a temperature of about 110–130° F., acidifying with sulfuric acid in an amount sufficient to cause gelation of the silica, adding sufficient sulfuric acid to neutralize 80–90% of the alkali originally present in the sodium silicate, adding a suspension of hydrated calcined magnesia to the resulting hydrogel in an amount sufficient to give a magnesium oxide content in the final product of 24–28%, accelerating the combination of the magnesia with the silica gel by adding sulfuric acid in an amount equivalent to 6–10 moles of input magnesium hydroxide per mole of acid, recovering the resulting silica-magnesia complex therefrom, dispersing said complex in an aqueous slurry containing free magnesium ions by re-slurrying the complex with a solution containing magnesium sulfate, adding a solution containing dissolved fluorine in an amount sufficient to impregnate said silica-magnesia complex with from 0.5 to 5 weight percent residual fluorine and drying, washing and redrying the resulting composite.

References Cited in the file of this patent
UNITED STATES PATENTS
2,901,440  Wilson _____ Aug. 25, 1959